(12) United States Patent
Brookes et al.

(10) Patent No.: US 11,767,878 B1
(45) Date of Patent: Sep. 26, 2023

(54) FLEX CONNECTION SYSTEM

(71) Applicant: Aerostar International, LLC, Columbia, MD (US)

(72) Inventors: Kyle Brookes, Redwood City, CA (US); John Cromie, Menlo Park, CA (US); Raymond Louis Gradwohl, Saratoga, CA (US)

(73) Assignee: Aerostar International, LLC, Columbia, MD (US)

( * ) Notice: Subject to any disclaimer, the term of this patent is extended or adjusted under 35 U.S.C. 154(b) by 508 days.

(21) Appl. No.: 16/862,748

(22) Filed: Apr. 30, 2020

Related U.S. Application Data (63) Continuation of application No. 16/026,361, filed on Jul. 3, 2018, now Pat. No. 10,676,170, which is a continuation of application No. 14/886,782, filed on Oct. 19, 2015, now Pat. No. 10,035,576.

(60) Provisional application No. 62/220,607, filed on Sep. 18, 2015.

(51) Int. Cl.
*F16C 11/06* (2006.01)
*B64B 1/40* (2006.01)
*B64D 1/22* (2006.01)

(52) U.S. Cl.
CPC ................ *F16C 11/06* (2013.01); *B64B 1/40* (2013.01); *B64D 1/22* (2013.01); *Y10T 403/32032* (2015.01)

(58) Field of Classification Search
CPC ............. F16C 11/06; B64B 1/40; B64D 1/22; Y10T 403/32032
USPC ........................................................ 403/56
See application file for complete search history.

(56) References Cited

U.S. PATENT DOCUMENTS

| | | | |
|---|---|---|---|
| 3,081,967 A | 3/1963 | Church | |
| 3,266,059 A * | 8/1966 | Stelle | B25J 9/06 138/131 |
| 3,330,023 A | 7/1967 | Frye et al. | |
| 3,814,353 A | 6/1974 | Nelson | |
| 4,739,801 A * | 4/1988 | Kimura et al. | H02G 11/006 174/68.2 |
| 4,751,821 A * | 6/1988 | Birchard | B25J 9/104 60/527 |
| 5,884,867 A | 3/1999 | Gordon et al. | |
| 7,536,931 B2 | 5/2009 | Saito | |
| 7,708,222 B2 | 5/2010 | Lee | |
| 8,191,504 B2 | 6/2012 | Blankenship | |

(Continued)

*Primary Examiner* — Muhammad Ijaz
(74) *Attorney, Agent, or Firm* — Kim and Lahey Law Firm, LLC (57) ABSTRACT

Aspects of the disclosure provide a flex connection for high altitude balloon applications. During operation flex connection allows a payload of a high-altitude balloon to remain level when an envelope of the balloon is tilted, in order to change the direction of the balloon. As an example, a system may include a balloon envelope, a payload, a cable between the balloon envelope and the payload, and a flex connection on the cable. The flex connection enables the payload to remain level relative to the ground when the balloon is in flight and the balloon envelope is tilted relative to the payload. The flex connection includes a top portion, a plurality of discs, and a bottom portion.

20 Claims, 10 Drawing Sheets

(56) References Cited

U.S. PATENT DOCUMENTS

| | | | |
|---|---|---|---|
| 8,245,593 B2 | 8/2012 | Graham et al. | |
| 8,414,246 B2 | 4/2013 | Tobey | |
| 8,632,064 B2 | 1/2014 | Salisbury, Jr. et al. | |
| 9,604,370 B2* | 3/2017 | Park et al. | A61B 1/00078 |
| 9,981,392 B2* | 5/2018 | Kim et al. | A61B 34/30 |
| 10,035,576 B1* | 7/2018 | Brookes et al. | B64B 1/40 |
| 10,213,919 B2 | 2/2019 | Axinte et al. | |
| 11,434,022 B2* | 9/2022 | Knoll et al. | B64D 47/00 |
| 2004/0195988 A1* | 10/2004 | Buckingham et al. | B25J 9/06 |
| | | | 318/560 |
| 2008/0265086 A1 | 10/2008 | Lee | |
| 2008/0283659 A1 | 11/2008 | Hornbaker | |
| 2013/0115544 A1 | 5/2013 | Davidson et al. | |
| 2014/0054412 A1 | 2/2014 | Guetta et al. | |
| 2015/0284065 A1 | 10/2015 | MacCallum et al. | |

\* cited by examiner

FLEX CONNECTION SYSTEM

CROSS REFERENCE TO RELATED APPLICATIONS

The present application is a continuation of U.S. Pat. Application No. 16/026,361, filed Jul. 3, 2018, which is a continuation of U.S. Pat. Application No. 14/886,762, filed Oct. 19, 2015, issued as U.S. Pat. No. 10,035,576, which claims the benefit of the filing date of U.S. Provisional Pat. Application No. 62/220,607 filed Sep. 18, 2015, the disclosures of which are hereby incorporated herein by reference.

BACKGROUND

Computing devices such as personal computers, laptop computers, tablet computers, cellular phones, and countless types of Internet-capable devices are increasingly prevalent in numerous aspects of modem life. As such, the demand for data connectivity via the Internet, cellular data networks, and other such networks, is growing. However, there are many areas of the world where data connectivity is still unavailable, or if available, is unreliable and/or costly. Accordingly, additional network infrastructure is desirable.

Some systems may provide network access via a balloon network operating in the stratosphere. Because of the various forces experienced by these balloons during deployment and operation, there is a balancing of needs between flexibility and stability of materials. For instance, during flight, these balloons may use changes in altitude to achieve navigational direction changes. As an example, a balloon may pump air into a bladder within the envelope which causes a shift in the center of gravity of the balloon, which in turn, causes the envelope to tilt to one side. In some examples, this tilt can be up to 60 degrees from vertical.

In cases where the balloons carry networking equipment or other devices powered at least in part by solar, the balloon may also include a solar panel. In such cases, while tilting the balloon, it is important to keep the solar panel oriented towards the sun. A despin mechanism may be used to torque the payload against the balloon. When in a tilted condition, rigid connection between the payload and the balloon, however, may lead to failure in the despin mechanism.

Typical joints are unable to meet the requirements of the high altitude balloons and thus may not be sufficient for continued use. For example, universal joints do not offer the required range of motion, having only 1 degree of motion, and have undesirable inflection points. They also tend to lack smooth transitions between angles and have a cantilever effect that may result in high stresses and possible breaking. While double universal joints can bend further than universal joint, double universal joints are still limited in the range of motion and are unable to support large axial loads such as those expected during tilt. Similarly, typically flex couplings and corrugated tubing such as that used in coolant hoses could be used, but may provide insufficient torque transmission between the payload and envelope and may not handle axial load as typically implemented. In addition, while a cable inside a flex coupling may be used, but manufacturing techniques presently available are not scalable to the number of balloons needed to support an entire network of balloons.

BRIEF SUMMARY

Aspects of the present disclosure are advantageous for high altitude balloon systems. For instance, one aspect of the disclosure provides high altitude balloon system including a balloon envelope, a payload, a cable, and a flex connection on the cable. The flex connection enables the payload to remain level relative to the ground when the balloon is in flight and the balloon envelope is tilted relative to the payload. The flex connection includes a top portion, a plurality of discs, and a bottom portion.

In one example, the system also includes a first crimp ferrule located adjacent to the top portion and a second crimp ferrule located adjacent to the bottom portion. The first crimp ferrule and the second crimp ferrule are configured to maintain a position of the flex connection relative to the cable. In another example, the top portion, plurality of discs and the bottom portion include a plurality of openings through which the cable is threaded. In this example, the flex connection is configured such that when the flex connection is flexed an amount of the cable between the top portion and the bottom portion does not change. In another example, a first disc of the plurality of discs is rigidly connected to the top portion. In this example, a second disc of the plurality of discs is rigidly connected to the bottom portion. In addition, a third disc of the plurality of discs is located between the first disc and the second disc and between the top portion and the bottom portion. The third disc is slidable relative to the first disc or the second disc. In addition, the second disc includes a set of fingers and the top portion includes a set of slots configured to rigidly connect to a corresponding one of the set of fingers. The first disc includes a set of teeth and the bottom portion includes a set of slots configured to rigidly connect to a corresponding one of the set of teeth. In another example, each given disc of the plurality of discs includes a set of slots arranged around a perimeter of the given disc and a set of fingers arranged around the perimeter, each finger having two protrusions configured to be compressed relative to one another in order to mate with a slot of the flex connector. In another example, the top portion and the bottom portion are crimped onto the cable.

Another aspect of the disclosure provides a flex connection system. The system includes a flex connection configured to enable a payload of a balloon to remain level relative to the ground when the balloon is in flight and a balloon envelope of the balloon is tilted relative to the payload. The flex connection includes a top portion, a plurality of discs, and a bottom portion.

In one example, the system also includes a first crimp ferrule located adjacent to the top portion and a second crimp ferrule located adjacent to the bottom portion. The first crimp ferrule and the second crimp ferrule are configured to maintain a position of the flex connection relative to the cable. In another example, the top portion, plurality of discs and the bottom portion include a plurality of openings through which the cable is threaded. In another example, the flex connection is configured such that when the flex connection is flexed an amount of the cable between the top portion and the bottom portion does not change. In another example, a first disc of the plurality of discs is directly adjacent to the top portion, a second disc of the plurality of discs is directly adjacent to the bottom portion, and a third disc of the plurality of discs is located between the first disc and the second disc and between the top portion and the bottom portion. The third disc is slidable relative to at least one of the first disc or the second disc. In addition, the second disc includes a set of fingers and the top portion includes a set of slots configured to rigidly connect to a corresponding one of the set of fingers. The first disc includes a set of teeth and the bottom portion includes a set of slots configured to rigidly connect to a corresponding one of the set of teeth. In another example, each given disc of the plurality of discs includes a set of slots arranged around a perimeter of the given disc and a set of fingers arranged around the perimeter. Each finger has two protrusions configured to be compressed relative to one another in order to mate with a slot of the flex connector.

A further aspect of the disclosure provides a method of configuring a flex connection on a cable. The method includes threading a bottom portion onto the cable such that the cable passes through a tubular portion of the bottom portion; threading a first disc onto the cable such that the cable passes through a central opening in the first disc from a bottom surface of the first disc towards a top surface of the first disc; threading a second disc onto the cable such that fingers of the second disc are lined up with slots of the first disc and domes of the first and second discs are lined up with one another; threading additional discs onto the cable until a last, top disc is threaded onto the cable; and threading a top portion onto the cable such that the cable passes through a tubular portion of the top portion.

In one example, the method also includes crimping a first crimp ferrule and a second crimp ferrule in order to maintain a position of the flex connection relative to the cable.

DETAILED DESCRIPTION

The present disclosure generally relates to providing techniques for launching high-altitude balloons such as those used in communication networks. A single network may include a large number of balloons, each of which includes a balloon envelope, a payload including a solar panel, and a cable or other connection between the envelope and the payload. To address the needs of high altitude balloons as discussed above, a flex connection may be used to keep the despin mechanism and payload level (to the ground) during tilt.

The flex connection may include a bottom portion, a top portion, and a plurality of discs there between. The bottom and top portions as well as each of the plurality of discs include an interior opening. Together, these openings form an open shaft that extends along a length of the flex connection. The shaft and openings are sized to fit a load cable which carries the load between the top and bottom portions.

The bottom and top portions of the flex connection may be configured to slide along the load cable. One or both of the bottom and top portions may be formed from metal such as steel. Two crimp ferrules, one at each end of the flex connection, may be used at the bottom and top portions in order to hold the flex connection at a particular location along the cable.

The top surface of the bottom portion may include a plurality of ridged teeth configured to be received into corresponding slots in a bottom disc of the plurality of discs. In this regard, a tooth may be press fit into a corresponding slot causing a ridged connection between the bottom disc and the bottom portion. In this regard, the teeth may be slightly larger than the slots. The connection between the teeth and the slots may be a press fit connection. The teeth may be spaced along a perimeter of the top surface of the bottom portion.

The bottom surface of the top portion may include a plurality of walls each including at least one first slot and a plurality of second slots between the walls and extending into the top surface. Each of the first slots may be configured to receive a corresponding tooth of a top disc. In this regard, a corresponding tooth may be press fit into a slot of the top portion causing a ridged connection between the top disc and the bottom portion. As with the bottom portion, the teeth may be slightly larger than the slots. The walls and second slots may be spaced along a perimeter of the bottom surface of the top portion. The second slots may be used to prevent damage to the discs as discussed below.

As noted above, the flex connection includes a plurality of discs. Each of the discs may be formed from plastic to allow some play in the structures of the discs. In addition to the bottom disc and the top disc, the plurality of discs may include a number of additional discs arranged between the bottom disc and the top disc. Each disc may include a set of slots arranged along an outer perimeter of the disc and a set of fingers arranged between the slots. The fingers are oriented upwards, extending from a bottom surface of a disc or towards the top portion of the flex connection. In addition, second slots, arranged below the fingers, prevent damage to the fingers under high load conditions.

A central region of each disc may include a hollow dome. This central opening of each disc may be located within a central region of the hollow dome. An outwardly curved portion of the dome may be oriented towards the bottom surface of the disc and an inwardly curved portion of the dome is oriented towards the top surface of the disc. Thus, when two discs are arranged adjacent to one another along a cable, the hollow domes may be configured to stack onto one another. The inwardly and outwardly curved shape of the hollow domes allows a dome of a first disc to easily slide within a dome of a second disc.

The fingers and slots may provide for two degrees of freedom between each disc while at the same time preventing rotation and translation between the discs. In this regard, between two discs in the flex connection, the fingers and slots may provide a stiff but slightly compliant connection that prevents rattle and allow for zero play between individual fingers and slots. When a first disc is tilted relative to a second disc, the protrusions of a first finger of the first disc may be forced towards one another and the first finger forced into a corresponding slot of the second disc. At the same time, a second finger opposite of the first finger may be pulled away from a corresponding slot of the second disc. Tilting the first disc in the opposite direction may pull the first finger out of the first slot and the protrusions of the second finger may be forced towards one another and the second finger forced into a corresponding slot of the second disc.

Because of the interaction of each pair of adjacent discs, the plurality of discs may allow for a constant radius bend. This, in turn, keeps the cable length (or rather the length of the internal central opening of the flex connection) constant. This may be critical to provide torque transmission without overstressing the flex connection and allowing for a stiff joint with slow bend action.

The number of additional discs may be selected according to the range of motion required for the flex connection. In other words, the amount of bend is limited only by the number of discs used. In addition, the discs allow for bending in any direction without going through an inflection point (as with the universal joints discussed above).

Each flex connection may thus require a bottom portion, a plurality of discs, and a top portion. These features may be arranged along a cable that mechanically connects the top and bottom portion which are connected mechanically to a balloon envelope and a payload, respecively. In this regard, when attaching the payload to the balloon envelope via a mechanical link, the flex connection may be inserted into the mechanical link to provide two axial degrees of freedom while maintaining torsional stiffness.

The flex connection provide load transmission between the payload and the envelope, flexibility with a constant cable length, a range of motion limited only by the number of components of the flex connection, ability to support hundreds of points of axial tension though a load cable, and limited or no backlash torque with much greater stiffness than a cable alone. This may allow the despin mechanism to remain level and operate freely during tilt.

EXAMPLE SYSTEM

Figure 1:
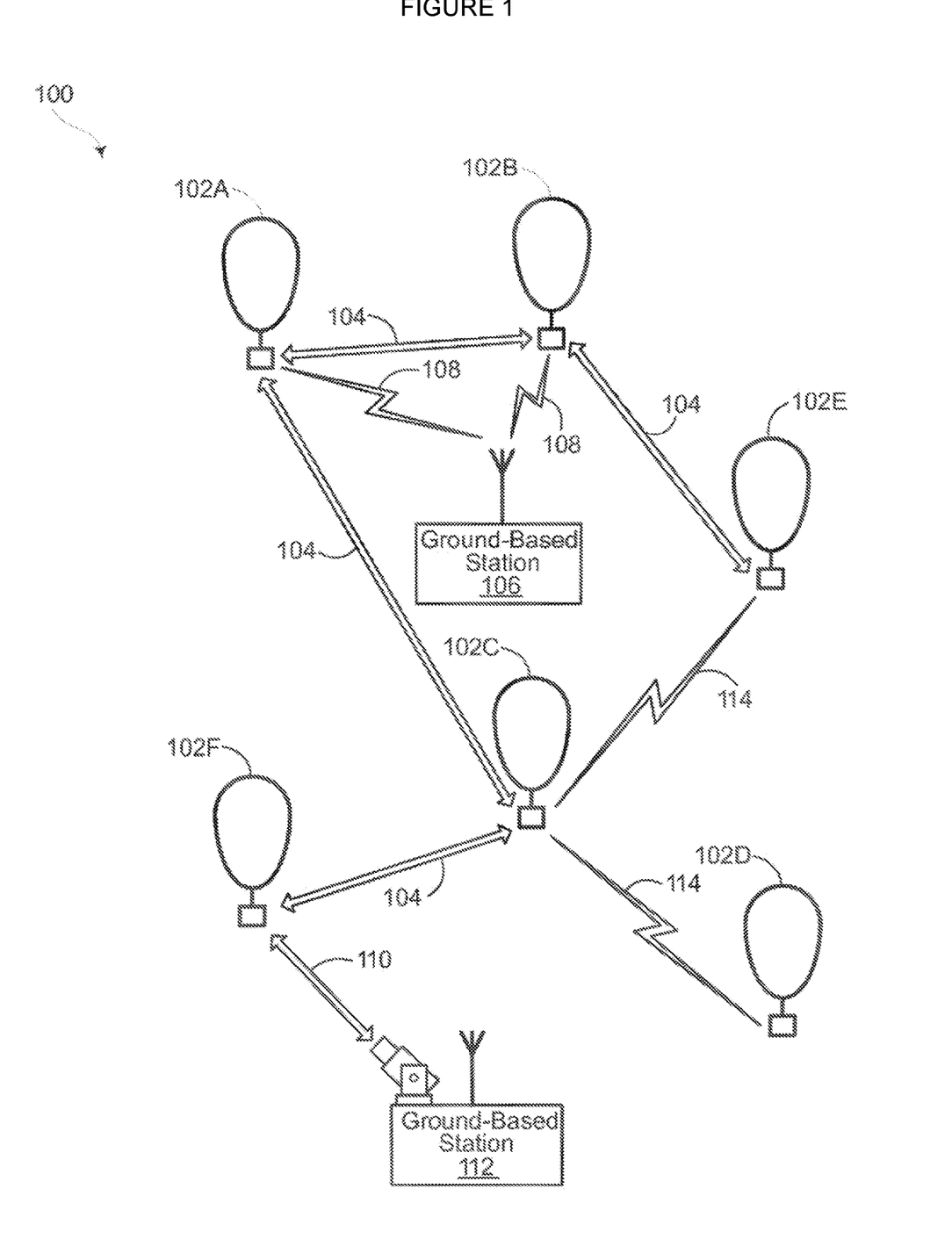
FIG. 1 is a functional diagram of a system in accordance with aspects of the present disclosure.

FIG. 1 depicts an example system 100 in which a balloon as described above may be used. This example should not be considered as limiting the scope of the disclosure or usefulness of the features of the present disclosure. For example, the techniques described herein can be employed on various types of standalone balloons or balloons used with other types of systems. In this example, system 100 may be considered a "balloon network." the system 100 includes a plurality of devices, such as balloons 102A-F, ground base stations 106 and 112 and links 104, 108, 110 and 114 that are used to facilitate intra-balloon communications as well as communications between the base stations and the balloons. One example of a balloon is discussed in greater detail below with reference to FIG. 2.

EXAMPLE BALLOON

Figure 2:
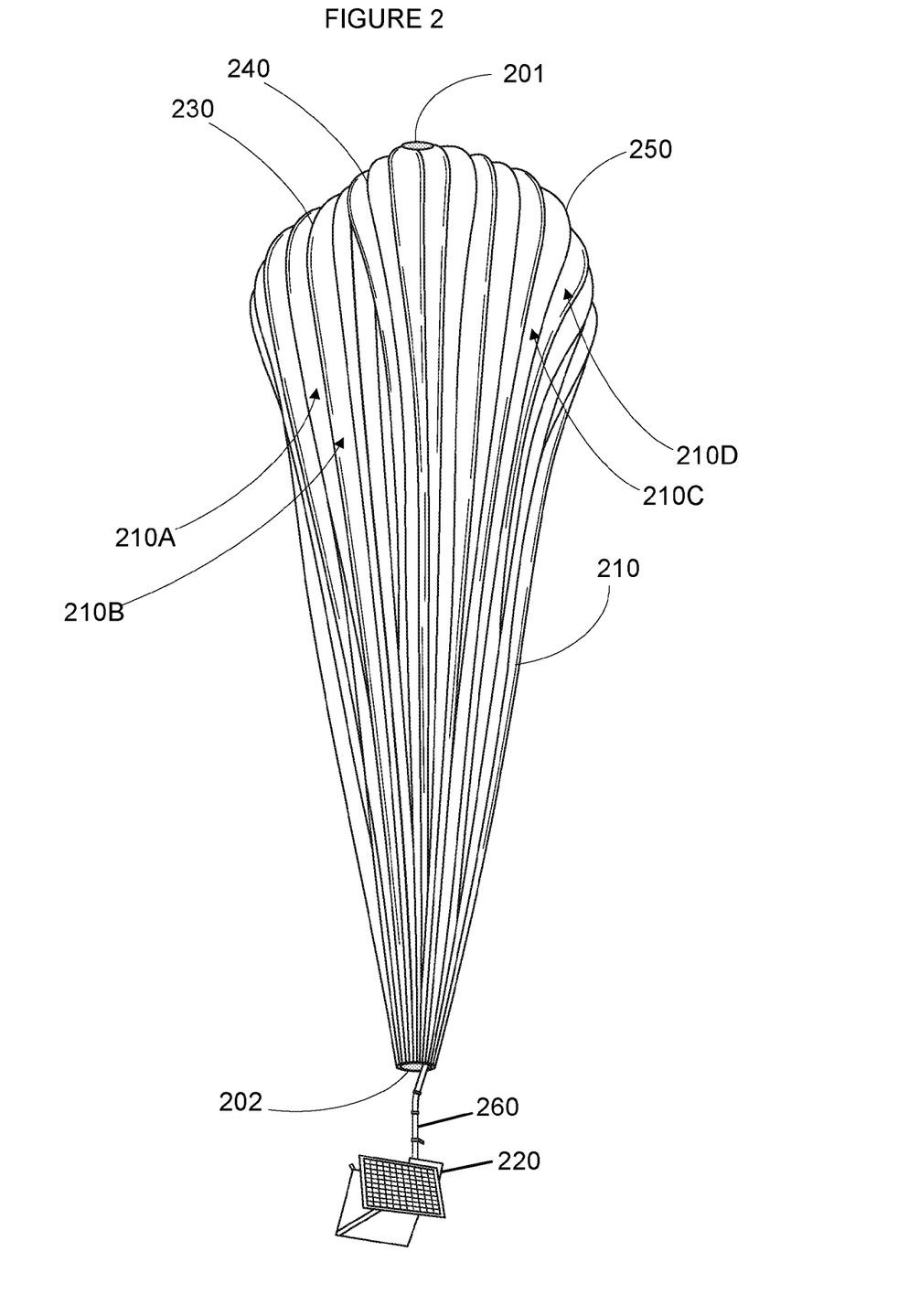
FIG. 2 is an example of a balloon in accordance with aspects of the present disclosure.

FIG. 2 is an example balloon 200, which may represent any of the balloons of balloon network 100. As shown, the balloon 200 includes an envelope 210, a payload 220 and a plurality of tendons 230, 240 and 250 attached to the envelope 210.

The balloon envelope 210 may take various forms. In one instance, the balloon envelope 210 may be constructed from materials such as polyethylene that do not hold much load while the balloon 200 is floating in the air during flight. Additionally, or alternatively, some or all of envelope 210 may be constructed from a highly flexible latex material or rubber material such as chloroprene. Other materials or combinations thereof may also be employed. Further, the shape and size of the envelope 210 may vary depending upon the particular implementation. Additionally, the envelope 210 may be filled with various gases or mixtures thereof, such as helium, hydrogen or any other lighter-than-air gas. The envelope 210 is thus arranged to have an associated upward buoyancy force during deployment of the payload 220.

The payload 220 of balloon 200 may be affixed to the envelope by a connection 260 such as a cable or other rigid structure. The payload 220 may include a computer system (not shown), having one or more processors and on-board data storage. The payload 220 may also include various other types of equipment and systems (not shown) to provide a number of different functions. For example, the payload 220 may include an optical communication system, a navigation system, a positioning system, a lighting system, an altitude control system and a power supply to supply power to various components of balloon 200.

In view of the goal of making the balloon envelope 210 as lightweight as possible, it may be comprised of a plurality of envelope lobes or gores that have a thin film, such as polyethylene or polyethylene terephthalate, which is lightweight, yet has suitable strength properties for use as a balloon envelope. In this example, balloon envelope 210 is comprised of envelope gores 210A - 210D.

Pressurized lift gas within the balloon envelope 210 may cause a force or load to be applied to the balloon 200. In that regard, the tendons 230 - 250 provide strength to the balloon 200 to carry the load created by the pressurized gas within the balloon envelope 210. In some examples, a cage of tendons (not shown) may be created using multiple tendons that are attached vertically and horizontally. Each tendon may be formed as a fiber load tape that is adhered to a respective envelope gore. Alternately, a tubular sleeve may be adhered to the respective envelopes with the tendon positioned within the tubular sleeve.

Top ends of the tendons 230, 240 and 250 may be coupled together using an apparatus, such as top cap 201 positioned at the apex of balloon envelope 210. Bottom ends of the tendons 230, 240 and 250 may also be connected to one another. For example, a corresponding apparatus, e.g., bottom cap 220, may be disposed at a base or bottom of the balloon envelope 210. The top cap 201 at the apex may be the same size and shape as and bottom cap 220 at the bottom. Both caps include corresponding components for attaching the tendons 230, 240 and 250 to the balloon envelope 210.

EXAMPLE ASSEMBLY

Figure 3:
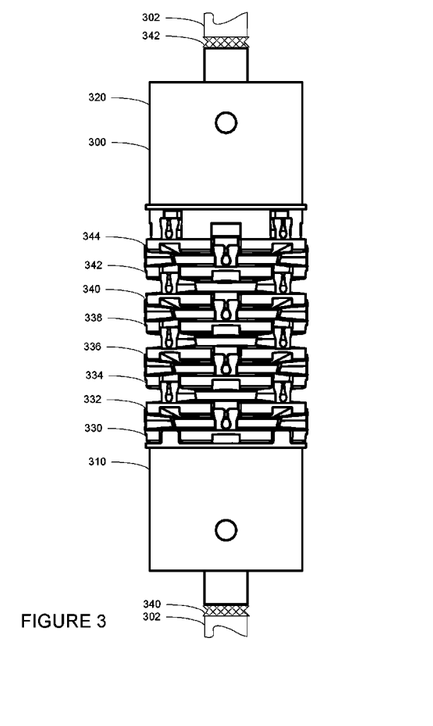
FIGS. 3 and 4 are example views of a flex connection in accordance with aspects of the present disclosure.
Figure 4:
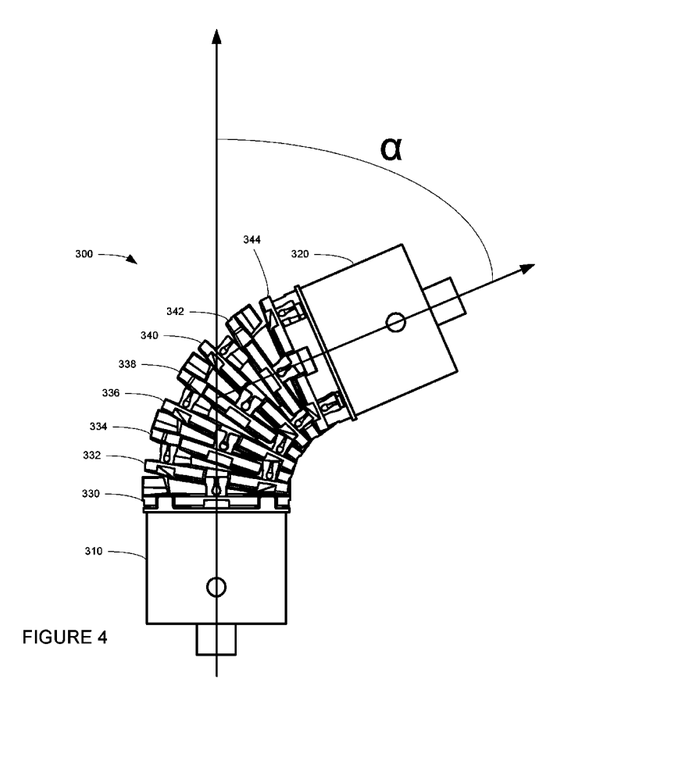

FIGS. 3 and 4 are example views of a flex connection 300 on a load cable 302. As an example, the load cable 303 may be a 3/16 inch steel cable. The flex connection includes a bottom portion 310, a top portion 320, and a plurality of discs 330–344 there between. FIG. 3 depicts the flex connection in a straight or un-flexed orientation, while FIG. 4 shows a flexed orientation of the flex connection as discussed in further detail below. Although not shown, each end of load cable 302 may be mechanically connected to a connection, similar to connection 260 which is mechanically attached to one of the balloon envelope or payload. The connections may therefore mechanically connect the top and bottom portions of the load cable balloon envelope and payload, respectively.

Figure 5:
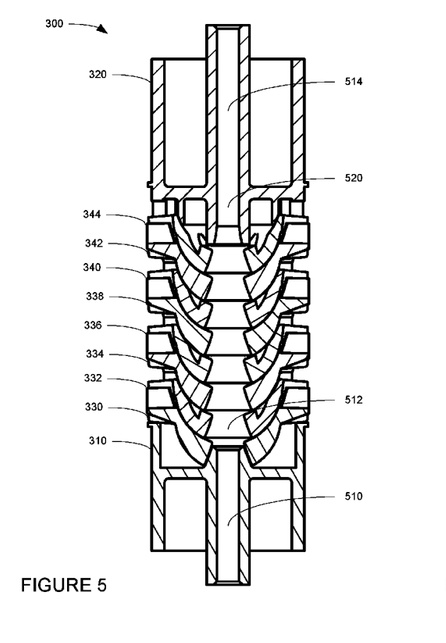
FIGS. 5 and 6 are example cross sectional views FIGS. 3 and 4, respectively, in accordance with aspects of the disclosure.
Figure 6:
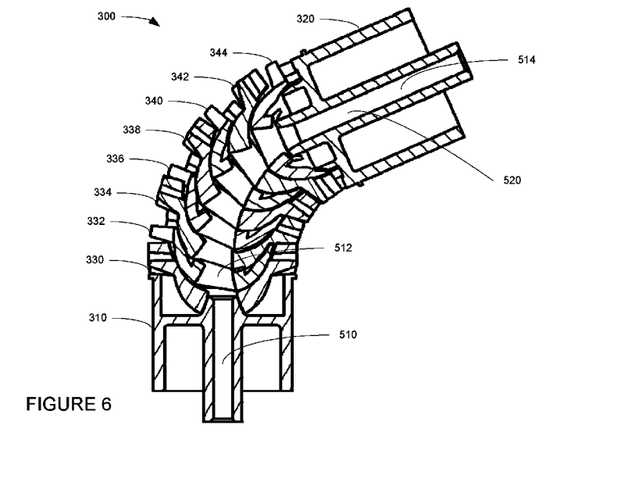

Each of the bottom and top portions as well as each of the plurality of discs include a respective interior opening. Together, these openings form an open shaft that extends along a length of the flex connection. For example, FIGS. 5 and 6 are cross sectional views of FIGS. 3 and 4, respectively, through interior openings 510, 512, and 514 which form the open shaft 520 that runs along the length of the flex connection. In this regard, FIG. 5 depicts the flex connection in a straight or un-flexed orientation, while FIG. 6 shows a flexed orientation of the flex connection. The shaft and openings are sized to fit a load cable which carries the load between the top and bottom portions. As an example, the flex connection may be approximately 5 inches long and 1.5 inches in width and the open shaft 520 may be sized to fit the cable 302, for instance, a 3/16 inch steel cable.

The bottom and top portions of the flex connection may be configured to slide along the load cable. One or both of the bottom and top portions may be formed from metal such as steel. Returning to FIG. 3, two crimp ferrules 340, 342, one at each end of the flex connection, may be used at the bottom and top portions in order to hold the flex connection at a particular location along the cable 302.

Figure 7:
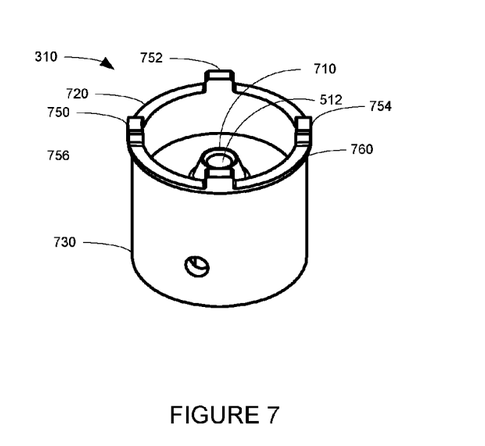
FIGS. 7 and 8 are example views of a bottom portion of the flex connection in accordance with aspects of the disclosure.
Figure 8:
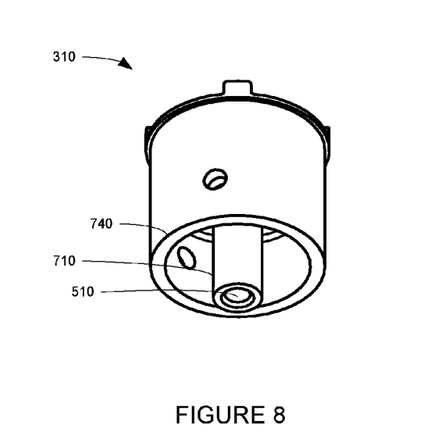

FIGS. 7 and 8 are example views of bottom portion 310. In this example, the bottom portion 310 includes a tubular potion 710 that extends from below a top surface 720 of a cylindrical body 730 to below at least a portion of the bottom surface 740 of the cylindrical body. This tubular portion may include an interior opening 510 through which the cable 302 may be placed.

The top surface 720 of the bottom portion 310 may include a plurality of ridged teeth 750–756 configured to be received into corresponding slots in a bottom disc 330 of the plurality of discs (see FIG. 3). In this regard, a tooth 750 may be press fit into a corresponding slot of bottom disc 330 causing a ridging connection between the bottom disc and the bottom portion. The teeth 750–756 may be slightly larger than the slots allowing for a press fit connection between the teeth and the slots. As shown in FIG. 7, the teeth 750–756 may be spaced along a perimeter 760 of the top surface 720 of the bottom portion 310. In this example, the top surface 720 of the bottom portion includes four teeth; however, more or less teeth may be used depending upon the configuration of the discs.

Figure 9:
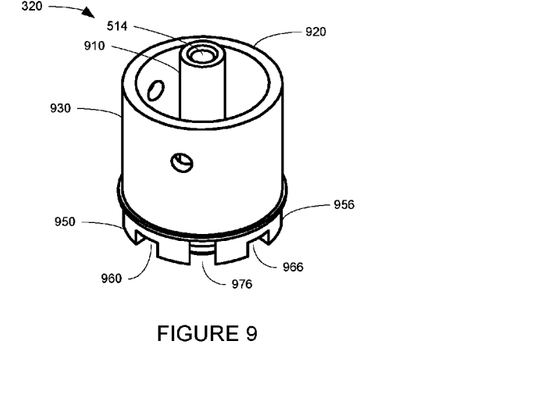
FIGS. 9 and 10 are example views of a top portion of the flex connection in accordance with aspects of the disclosure.
Figure 10:
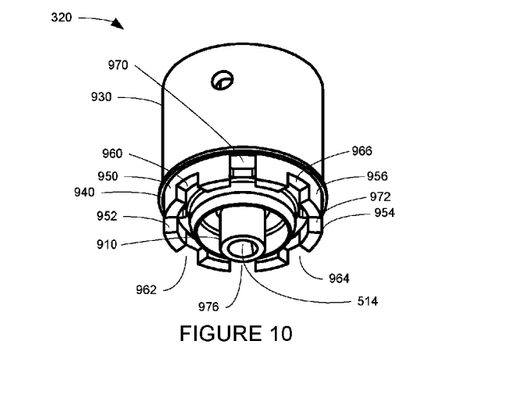

FIGS. 9 and 10 are example views of top portion 320. The top portion 320 may also include a cylindrical body 930 having a top surface 920 and a bottom surface 940 configured to interact with a disc of the plurality of discs (not shown). As an example, a tubular portion 910 may extend from above the top surface 920 of the cylindrical body 930 and below at least a portion of the bottom surface 940 of the cylindrical body. This tubular portion 910 may include a interior opening 514 through which the cable may be placed.

The bottom surface of the top portion may include a plurality of walls 950–956 each including a plurality of first slots 960–966 and a plurality of second slots 970–976 between the walls and extending into the top surface 920. Each of the first slots 960–966 may be configured to receive a corresponding tooth of a top disc 344 of the plurality of discs (see FIG. 3). In this regard, a corresponding tooth may be press fit into a corresponding slot of the top disc as discussed below causing a ridged connection between the top disc and the bottom portion. As with the bottom portion 310, the teeth may be slightly larger than the slots.

In addition, returning to FIGS. 9 and 10, the second slots 970–976 and may act as integrated stops in order to prevent damage to the fingers of a second disc 332 under high load conditions. The walls 950–956 and second slots may be spaced along a perimeter of the bottom surface of the top portion 320. In one example, the bottom surface 940 of the top portion 320 may include four walls 950–956, four first slots 960–966, and four second slots 970–976; however, more or less walls and slots may be used depending upon the configuration of the top disc.

As noted above, the flex connection 300 includes a plurality of discs. Each of the discs may be formed from plastic to allow some play in the structures of the discs. In addition to the bottom disc 330 and the top disc 344, the plurality of discs may include a number of additional discs arranged between the bottom disc and the top disc. Each disc of the plurality of discs may include the same configuration.

Figure 11:
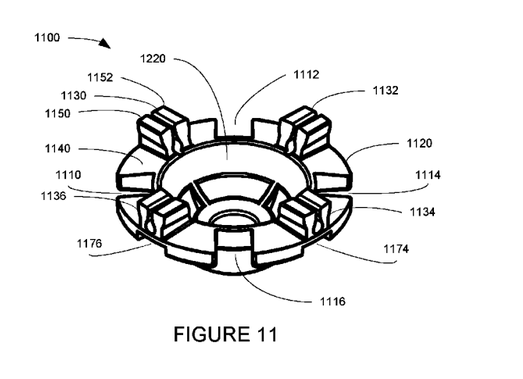
FIGS. 11 and 12 are example views of a disc of the flex connection in accordance with aspects of the disclosure.
Figure 12:
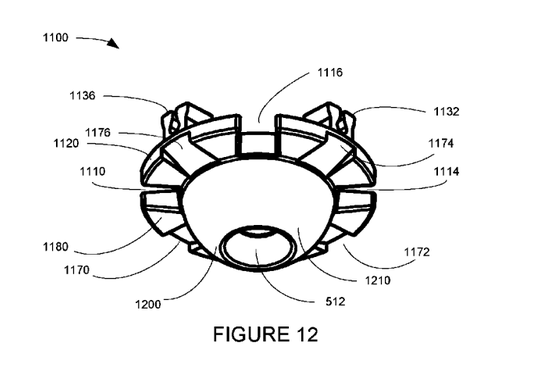

FIGS. 11 and 12 are example views of a disc 1100 corresponding to each of the plurality of discs 330–344. Each disc may include a set of first slots 1110–1116 arranged along an outer perimeter 1120 of the disc and a set of fingers 1130–1136 arranged between the first slots. The fingers 1130–1136 are oriented upwards, extending from a top surface 1140 of a disc or towards the top portion 320 of the flex connection 300 (see FIG. 3). Each finger 1130–1136 includes two protrusions 1150, 1152 (see finger 1130 of FIG. 11), configured to flex towards one another in order to allow the finger to fit within a corresponding first slot 1160–1166 of a top surface 1170 of an adjacent disc, or in the case of the top disc 344, within the corresponding first slot 960–966 of the top portion 320.

In addition, second slots 1170–1176 below each of the fingers 1130–1136 may act as integrated stops in the bottom surface 1180 in order to prevent damage to the fingers of another disc (or the teeth 750–756 of the bottom portion 310) adjacent to a directly adjacent disc under high load conditions. As an example, the second slots 1170–1176 of disc 344 may prevent damage to the fingers 1130–1136 of disc 340. Similarly, the second slots 1170–1176 of disc 332 may prevent damage to the teeth 750–756 of bottom portion 310.

A central region of each disc includes a hollow dome 1200. The central opening 512 of each disc may be located within the central region of the hollow dome. An outwardly curved portion of the dome 1210 is oriented towards the bottom surface 1140 of the disc and an inwardly curved portion of the dome 1220 is oriented towards the top surface 1140 of the disc. Thus, when two discs are arranged adjacent to one another along a cable, the hollow domes 1200 may be configured to stack onto one another. The inwardly and outwardly curved shape of the hollow domes allows a dome of a first disc to easily slide within a dome of a second disc.

The fingers 1130–1136 and first slots 1160–1166 may provide for two degrees of freedom between each disc 330–344 while at the same time preventing rotation and translation between the discs. In this regard, between two discs in the flex connection, the fingers and first slots may provide a stiff but slightly compliant connection that prevents rattle and allow for zero play between individual fingers and first slots. For instance, when a first disc is slid or tilted relative to a second disc, the protrusions of a first finger, such as protrusions 1150 and 1152 of finger 1130 of the first disc may be forced towards one another. At the same time, the first finger 1130 may be forced into a corresponding first slot, such as first slot 1160, of the second disc. At the same time, a second finger of the first disc opposite of the first finger, such as finger 1134 may be pulled away from a corresponding first slot, such as first slot 1164, of the second disc. Similarly, tilting the first disc in the opposite direction may pull the first finger 1130 out of the corresponding first slot 1132 of the second disc. The second finger 1134 of the first disc may also be forced back into a corresponding second slot 1164 of the second disc. Thus, the protrusions of the second finger 1134 of the first disc may be forced towards one another in order to fit into the corresponding second slot 1164 of the second disc.

Because of the interaction of each pair of adjacent discs, the plurality of discs may allow for a constant radius bend. This, in turn, keeps the cable length (or rather the length of the internal central opening of the flex connection) constant. This may be critical to provide torque transmission without overstressing the flex connection and allowing for a stiff joint with slow bend action.

The number of additional discs may be selected according to the range of motion required for the flex connection. In other words, the amount of bend (or angle α as shown in FIG. 2) is limited only by the number of discs used. For example, each disc may allow for flexing of between 8 and 12 degrees. Thus, with 8 discs as shown in FIGS. 1 and 2 (two of which are the top and bottom discs which are rigidly connected to the top and bottom portions, respectively, and as such are static), angles of greater than 60 degrees may be achieved. In addition, the discs allow for bending in any direction without going through an inflection point (as with the universal joints discussed above).

In an alternative, rather than using the crimp ferrule at the bottom portion 310, the bottom portion may include a cylindrical body configured for ridged attachment to the cable. As an example, a tubular potion, somewhat similar to tubular potion 710, may be configured to be crimped close to the bottom surface of the cylindrical body by a crimping tool in order to rigidly attach the bottom portion to the cable. Similarly, rather than using the crimp ferrule at the top portion, the top portion may include a cylindrical body configured for ridged attachment to the cable. In this regard, a tubular portion, somewhat similar to tubular potion 910, of the top portion may be configured to be crimped close to the top surface cylindrical body by a crimping tool in order to rigidly attach the top portion to the cable.

Figures 13, 14, 15:
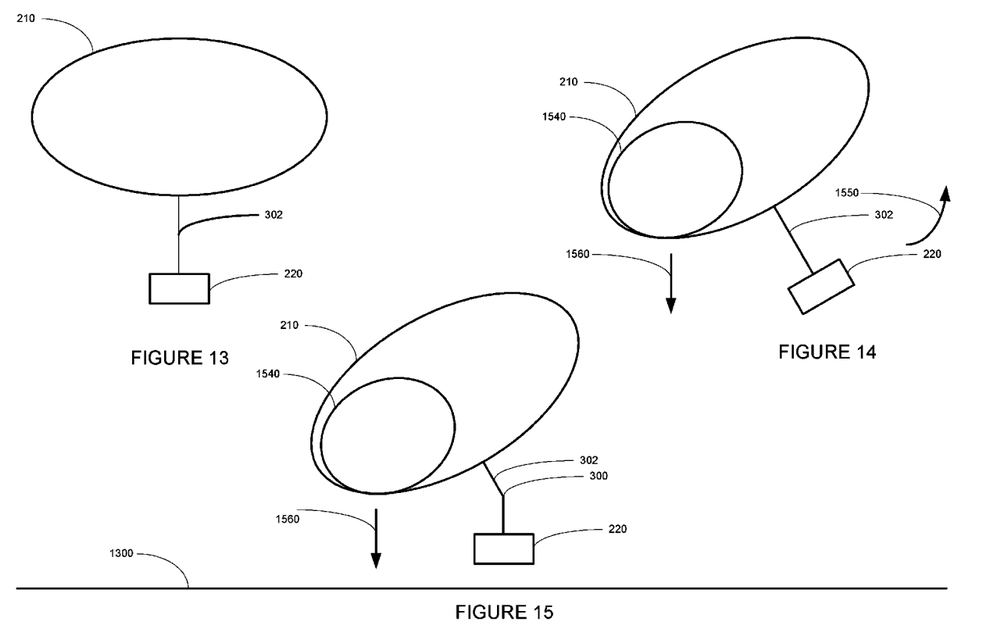
FIGS. 13-15 are examples of a balloon in flight in accordance with aspects of the disclosure.

In operation, the flex connection allows a payload to remain level or in its preferred orientation relative to the ground surface or the gravity vector. FIGS. 13-15 are examples of high altitude balloons in flight and demonstrate the benefits of the flex connection. In these examples, the shapes and sizes of the balloon envelope 210, cable 302, air ballast 1540, and payload 220 are exaggerated for clarity and ease of understanding. In the example of FIG. 11, the balloon 200 is generally in line with the payload 220 via the cable 302. In the example of FIGS. 14 and 15, a turning maneuver is accomplished by inflating an air ballast 1410 with a gas, such as air, that is heavier than the lift gas. This causes the balloon envelope 210 to tilt in the direction of the air ballast 1540, thereby causing the balloon 200 to change direction. As can be seen in FIG. 14, without the flex connection 300, the payload 220 tends to swing like a pendulum in an arc shown by arrow 1550, away from the direction of the pull force of the air ballast 1540 shown by arrow 1560. This causes the payload to no longer be level or in line with the ground surface 1300.

However, in the example of FIG. 15, the pull force of the air ballast causes the flex connection to move to the flexed orientation. For instance, the hollow domes 1200 of the discs begin to slide relative to one another, pulling the fingers and slots away from one another at one end of the discs, and towards one another at the opposite end of the discs. The greater the mass of ballast air, the greater the tilt angle of the balloon, and thus the greater the deflection in the flex connection. This enables the payload to remaining vertically aligned with the gravity vector (or level to the ground surface 1300 or horizon).

The flex connection provide load transmission between the payload and the envelope, flexibility with a constant cable length, a range of motion limited only by the number of components of the flex connection, ability to support hundreds of points of axial tension though a load cable, and limited or no backlash torque with much greater stiffness than a cable alone. This may allow the despin mechanism to remain level and operate freely during tilt.

EXAMPLE FLOW DIAGRAM

Figure 16:
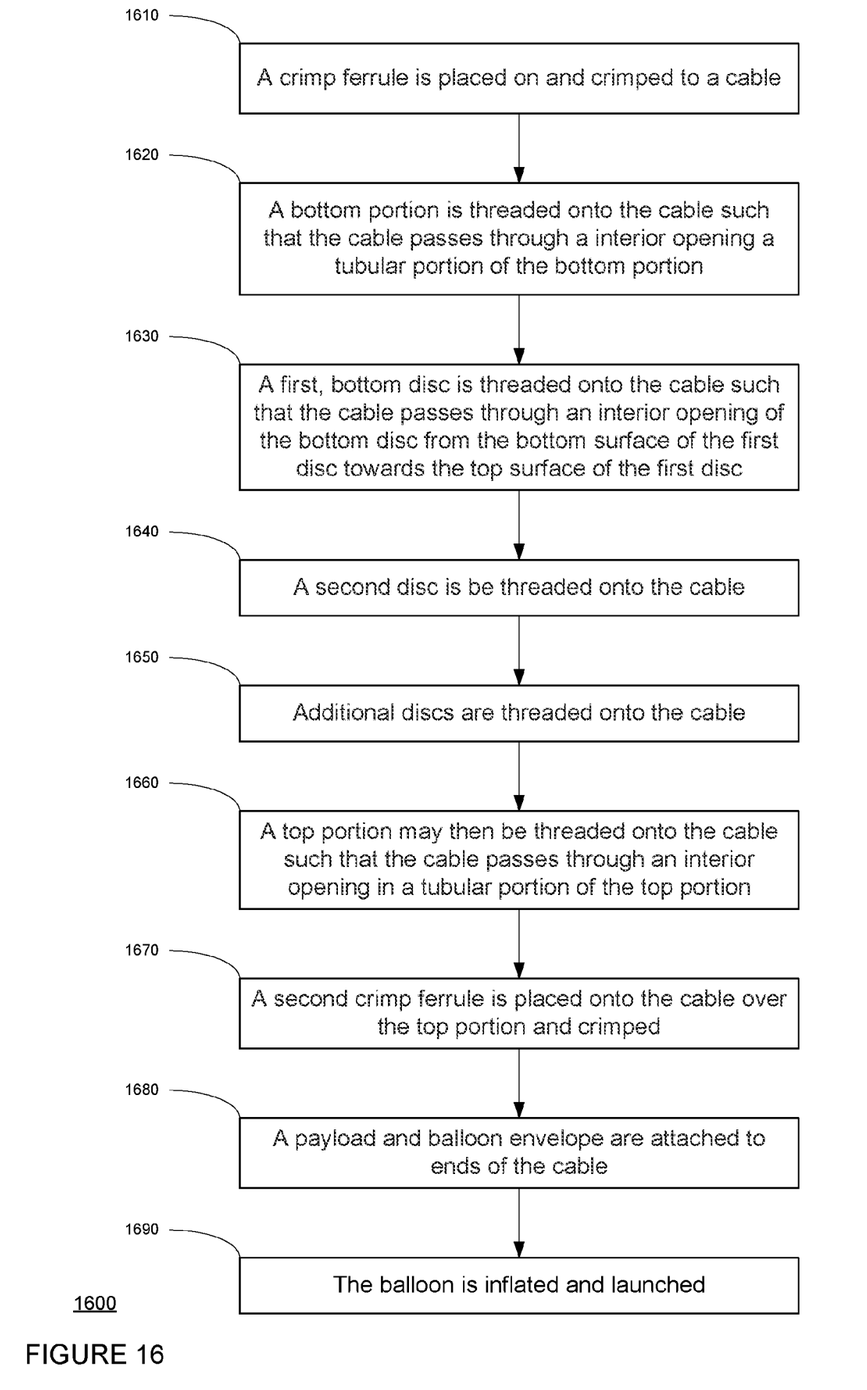
FIGS. 16 and 17 are example flow diagrams in accordance with aspects of the disclosure.
Figure 17:
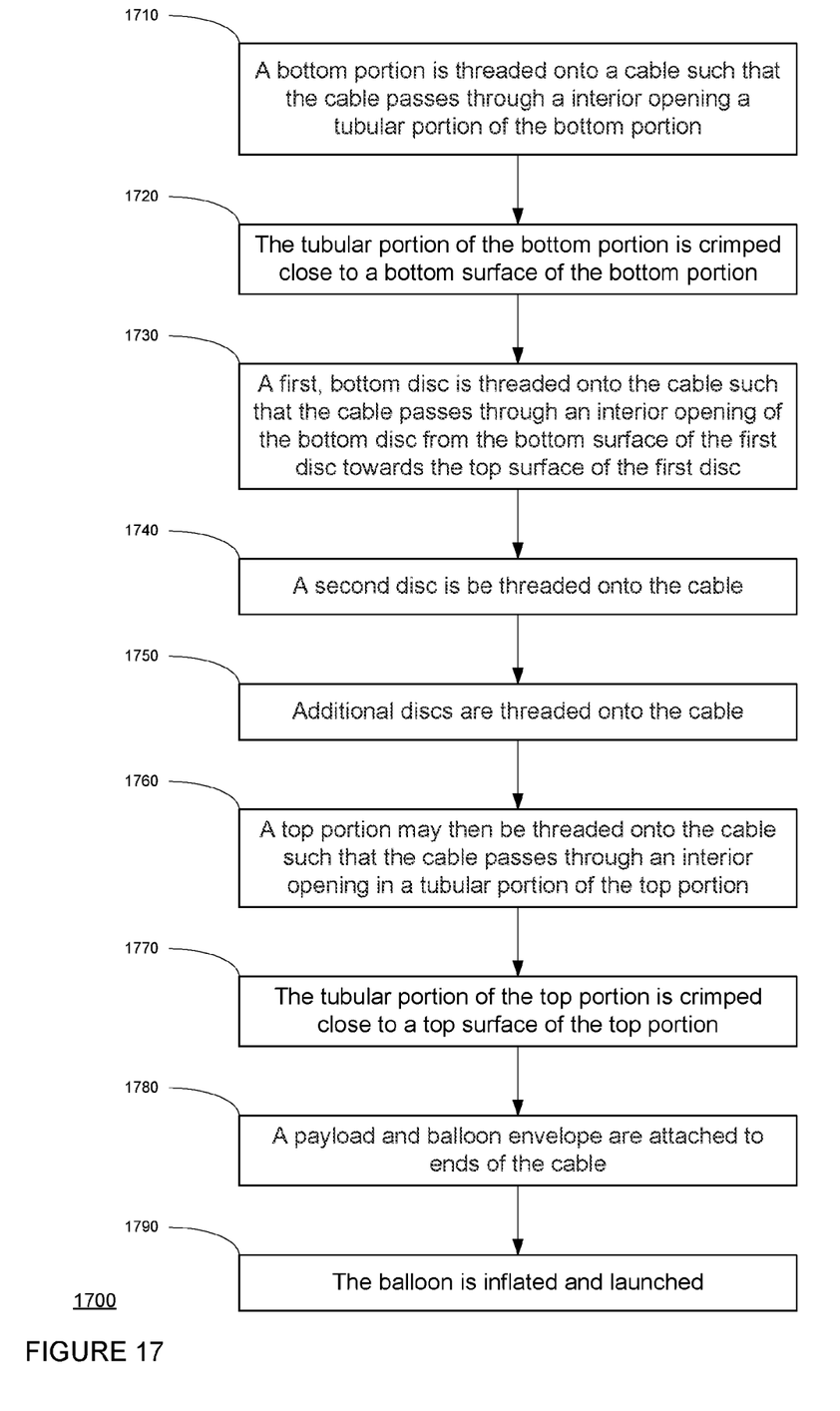

Each flex connection may require a bottom portion 310, a plurality of discs 330–346, and a top portion 320. These features may be arranged along the cable 302 that mechanically connects the top and bottom portion. These top and bottom portions are then mechanically connected to the the balloon envelope 210 and payload 220, respectively. In this regard, when attaching the payload to the balloon envelope via a mechanical link, the flex connection may be inserted into the mechanical link to provide two axial degrees of freedom while maintaining torsional stiffness. FIGS. 16 and 17 are example flow diagrams 1600 and 1700 which demonstrates the attachment of a flex connection, such as flex connection 300 to a cable, such as cable 302.

In the example flow diagram 1600 of FIG. 16, a crimp ferrule 340 is placed on and crimped to the cable, for example using a crimping tool at block 1610. The crimp ferrule may be placed a point along the cable corresponding to where a bottom portion 310 of the flex connection 330 will rest on the cable. Next, the bottom portion 310 may be threaded onto the cable such that the cable passes through a interior opening 510 a tubular portion 710 of the bottom portion at block 1620.

A first, bottom disc 330 may then be threaded onto the cable 302 such that the cable passes through the interior opening 520 from the bottom surface 1140 of the first disc towards the top surface 1120 of the first disc at block 1630. The slots 1160–1166 of the first disc may be oriented to mate with the teeth 750–756 of the bottom portion 310. A second disc may then be threaded onto the cable in the same manner as the first disc at block 1640. The fingers 1130–1136 of the second disc may be lined up with the first slots 1160-1166 of the first disc, though not completely mated. In addition, the domes 1200 of the first and second discs, and in particularly the outwardly and inwardly curved portions, may be lined up with one another. Additional discs may be similarly added to the flex connection at block 1650, until a last, top disc 344 is threaded onto the cable 302 in the same manner as the first and second discs.

The top portion 320 may then be threaded onto the cable such that the cable passes through an interior opening 530 in a tubular portion 910 of the top portion at block 1670. The top portion 320 may be compressed against the top disc 344 such that the protrusions of the fingers 1130–1136 of the top disc are forced into the first slots 960–966 of the top portion. A second crimp ferrule 342 is placed onto the cable over the top portion and crimped, for example using a crimping tool, at block 1680. Together the first and second crimp ferrules 430, 342 maintain the position of the flex connection 300 relative to the cable 302. The payload 220 and balloon envelope 210 may then be attached to the ends of the cable at block 1670. This completed balloon 200 may then be inflated and launched at block 1690.

Turning to the example flow diagram 1700 of FIG. 17, a bottom portion 310 may be threaded onto the cable 302 such that the cable passes through an interior opening 510 in a tubular portion, similar to tubular portion 710, of the bottom portion at block 1710. The tubular portion may then be crimped close to or at the bottom surface of the bottom portion at block 1720.

A first, bottom disc 330 may then be threaded onto the cable 302 such that the cable passes through the central opening from the bottom surface of the first disc towards the top surface of the first disc at block 1730. The slots 1160–1166 of the first disc may be oriented to mate with the teeth 750–766 of the bottom portion 310. A second disc 332 may then be threaded onto the cable 302 in the same manner as the first disc at block 1740. The fingers 1130–1136 of the second disc may be lined up with the first slots 1160–1166 of the first disc, though not completely mated. In addition, the domes 1200 of the first and second discs, and in particular the outwardly and inwardly curved portions, may be lined up with one another. Additional discs may be similarly added to the flex connection at block 1750, until a last, top disc 344 is threaded onto the cable in the same manner as the first and second discs.

The top portion 320 may then be threaded onto the cable such that the cable passes through an interior opening 530 of a tubular portion, similar to tubular portion 910, of the top portion at block 1760. The top portion 320 may be compressed against the top disc 344 such that the protrusions of the fingers 1130–1136 of the top disc are forced into the first slots 960–966 of the top portion. The tubular portion 910 may then be crimped close to or at a top surface 920 of the top portion thus completing the flex connection at block 1770. The payload 220 and balloon envelope 210 may then be attached to the ends of the cable at block 1860. This completed balloon 200 may then be inflated and launched at block 1790.

Although the features described herein are discussed in relation to high altitude balloons, such features may be used in any lighter than air inflatable structure where torsional stiffness and a vertical orientation are required under a platform that tils in 2 axes.

Aspects, features and advantages of the disclosure will be appreciated when considered with reference to the foregoing description of embodiments and accompanying figures. The same reference numbers in different drawings may identify the same or similar elements. Furthermore, the following description is not limiting; the scope of the present technology is defined by the appended claims and equivalents. While certain processes in accordance with example embodiments are shown in the figures as occurring in a linear fashion, this is not a requirement unless expressly stated herein. Different processes may be performed in a different order or concurrently. Steps may also be added or omitted unless otherwise stated.

Most of the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. As an example, the preceding operations do not have to be performed in the precise order described above. Rather, various steps can be handled in a different order or simultaneously. Steps can also be omitted unless otherwise stated. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A system comprising:
    a cable; and
    a flex connection on the cable which enables a first object to remain level relative to a ground when a second object at is tilted relative to the first object, the flex connection including:
        a top portion;
        a plurality of discs each including a set of slots arranged around a perimeter of the given disc and a set of fingers arranged around the perimeter, each finger of the set of fingers having two protrusions configured to be compressed relative to one another in order to mate with a slot of an adjacent disc of the plurality of discs; and
        a bottom portion, and
        wherein the top portion, each of the plurality of discs and the bottom portion each include an opening through which the cable is threaded.

2. The system of claim 1, further comprising a first crimp ferrule located adjacent to the top portion and a second crimp ferrule located adjacent to the bottom portion, the first crimp ferrule and the second crimp ferrule being configured to maintain a position of the flex connection relative to the cable.

3. The system of claim 1, wherein the first object is arranged at a first end of the cable and the second object is arranged at a second end of the cable.

4. The system of claim 1, wherein the flex connection is configured such that when the flex connection is flexed an amount of the cable between the top portion and the bottom portion does not change.

5. The system of claim 1, wherein a first disc of the plurality of discs is connected to the top portion.

6. The system of claim 5, wherein a second disc of the plurality of discs is connected to the bottom portion.

7. The system of claim 6, wherein a third disc of the plurality of discs is located between the first disc and the second disc and between the top portion and the bottom portion, the third disc being slidable relative to the first disc or the second disc.

8. The system of claim 6, wherein the top portion includes a set of top portion slots configured to connect to a respective one of the set of fingers carried by said first disc.

9. The system of claim 5, wherein the bottom portion includes a set of teeth and a second disc includes a set of slots configured to connect to a respective one of the set of teeth.

10. The system of claim 1, wherein each given disc of the plurality of discs includes a hollow dome with a central opening.

11. The system of claim 1, wherein the top portion and the bottom portion are crimped onto the cable.

12. A flex connection system comprising:
    a flex connection configured to enable a first object to remain level relative to a ground when a second object is tilted relative to the first object, the flex connection including:
        a top portion;
        a plurality of discs each including a set of slots arranged around a perimeter of the given disc and a set of fingers arranged around the perimeter, each finger of the set of fingers having two protrusions configured to be compressed relative to one another in order to mate with a slot of an adjacent disc of the plurality of discs; and
        a bottom portion, and
        wherein the top portion, each of the plurality of discs and the bottom portion each include an opening.

13. The system of claim 12, further comprising a first crimp ferrule located adjacent to the top portion and a second crimp ferrule located adjacent to the bottom portion, the first crimp ferrule and the second crimp ferrule being configured to maintain a position of the flex connection relative to the cable.

14. The system of claim 12, further comprising a cable, wherein the flex connection is configured such that when the flex connection is flexed an amount of the cable between the top portion and the bottom portion does not change.

15. The system of claim 12, wherein a first disc of the plurality of discs is directly adjacent to the top portion, a second disc of the plurality of discs is directly adjacent to the bottom portion, and a third disc of the plurality of discs is located between the first disc and the second disc and between the top portion and the bottom portion, the third disc being slidable relative to at least one of the first disc or the second disc.

16. The system of claim 15, wherein the top portion includes a set of top portion slots configured to connect to a respective one of the set of fingers carried by said first disc.

17. The system of claim 15, wherein the bottom portion includes a set of bottom portion teeth and the second disc includes the set of slots configured to connect to a respective one of the set of bottom portion teeth.

18. The system of claim 12, wherein each given disc of the plurality of discs includes a hollow dome with a central opening.

19. A method of configuring a flex connection on a cable, the method comprising:
   providing a plurality of discs each including a set of slots arranged around a perimeter of the given disc and a set of fingers arranged around the perimeter, each finger of the set of fingers having two protrusions configured to be compressed relative to one another in order to mate with a slot of an adjacent disc of the plurality of discs
   threading a bottom portion onto the cable such that the cable passes through a tubular portion of the bottom portion;
   threading a first disc onto the cable such that the cable passes through a central opening in the first disc from a bottom surface of the first disc towards a top surface of the first disc;
   threading a second disc onto the cable such that the fingers of the second disc are lined up with the slots of the first disc and domes of the first and second discs are lined up with one another and the two protrusion of each finger of the second disc are compressed relative to one another in order to mate with a respective one of the slots of the first disc;
   threading additional discs onto the cable until a last, top disc is threaded onto the cable; and
   threading a top portion onto the cable such that the cable passes through a tubular portion of the top portion such that the top portion, each of the plurality of discs and the bottom portion each include an opening through which the cable is threaded,
   whereby a flex connection on the cable is provided which enables a first object to remain level relative to the ground when a second object at is tilted relative to the first object.

20. The method of claim 19, wherein mechanically attaching the top portion includes inserting the top portion into a mechanical link to provide at least two axial degrees of freedom.

* * * * *